United States Patent [19]

Perren

[11] 4,359,637
[45] Nov. 16, 1982

[54] FEELER FOR A MONITORING APPARATUS

[76] Inventor: Benno Perren, Austrasse 33, 5430 Wettingen, Switzerland

[21] Appl. No.: 140,248

[22] Filed: Apr. 14, 1980

[30] Foreign Application Priority Data

Apr. 20, 1979 [CH] Switzerland .................. 3726/79

[51] Int. Cl.³ .............................................. G02B 5/14
[52] U.S. Cl. ................................. 250/227; 250/231 R; 374/204
[58] Field of Search ......................... 250/227, 231 R; 73/363.1

[56] References Cited

U.S. PATENT DOCUMENTS 4,071,753 1/1978 Fulenwider et al. ............... 250/227

Primary Examiner—David C. Nelms
Assistant Examiner—Darwin R. Hostetter
Attorney, Agent, or Firm—Werner W. Kleeman

[57] ABSTRACT

With the heretofore known monitoring systems the parameters or magnitudes to be monitored are converted into electrical signals and transmitted, by means of electrical lines or conductors, to a central station. Because electrical signal transmitters are undesired, particularly in explosion endangered atmospheres or surroundings and, further, since spurious signals can be induced in electrical signal lines, proposals have already been made to utilize monitoring apparatuses working with optical signal conductors. The different embodiments of feelers of the invention, for optical monitoring apparatuses, enable monitoring the continuous change and/or exceeding a predetermined threshold, of electrical, mechanical and thermal parameters or the like.

7 Claims, 10 Drawing Figures

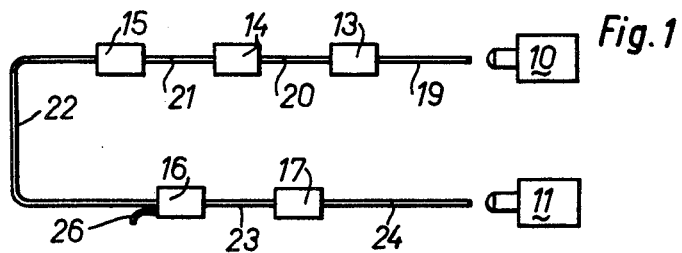
Fig. 1
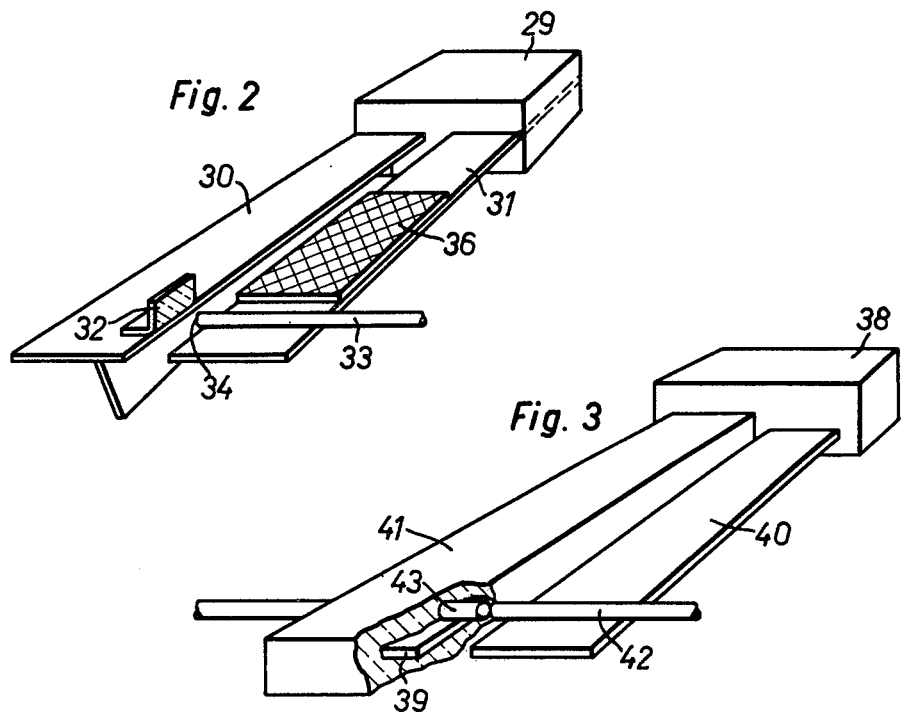
Fig. 2
Fig. 3
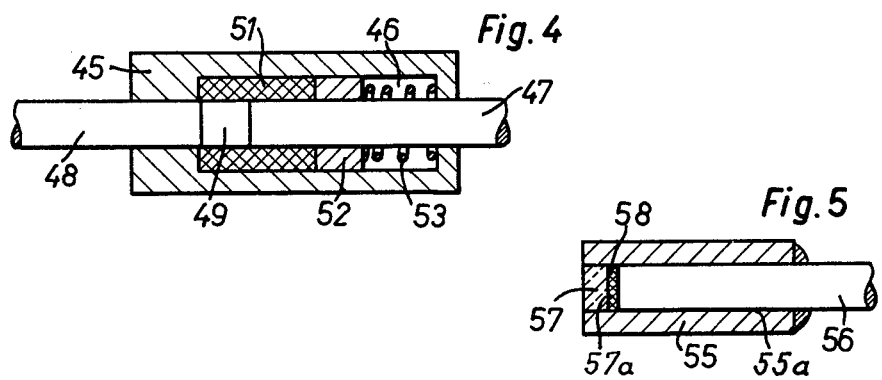
Fig. 4
Fig. 5

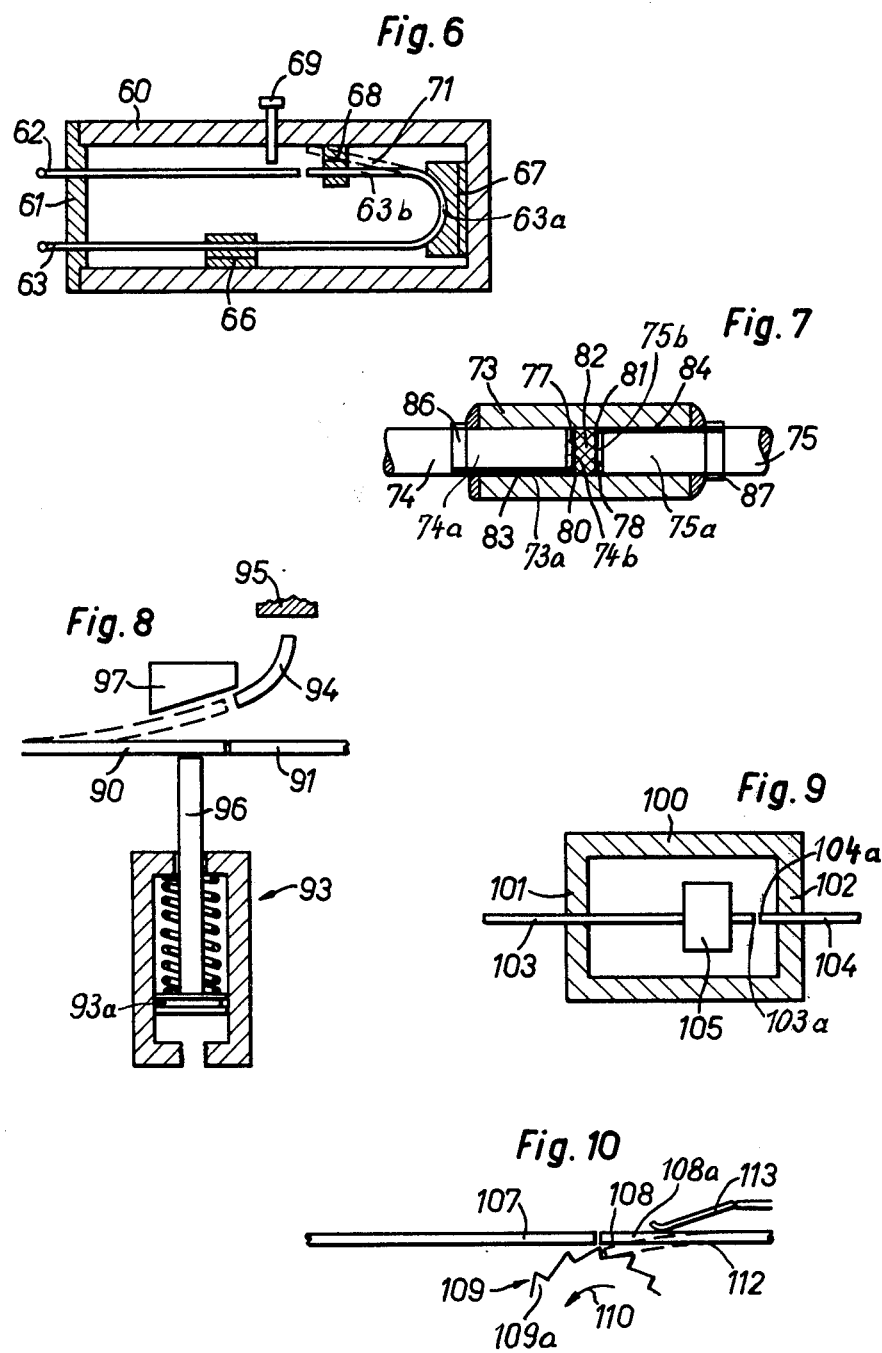

FEELER FOR A MONITORING APPARATUS

CROSS-REFERENCE TO RELATED CASES

This application is related to my copending United States applications Ser. No. 881,799, filed Feb. 2, 1978, Ser. No. 929,851, filed July 31, 1978 and Ser. No. 929,850, filed July 31, 1978.

BACKGROUND OF THE INVENTION

The present invention relates to a new and improved construction of a feeler for a monitoring apparatus, which is of the type comprising a light source for generating a monitoring signal, at least one optical conductor or guide for further conducting such signal and a light receiver, which produces a fault signal upon change of the infed monitoring signal.

For the continuous monitoring of the operating state and critical operating parameters of machines and installations there are already known to the art a large number of monitoring apparatuses. The majority of such equipment contains electrical or electronic feelers or sensors, which are connected with an electrical supply voltage and/or signal line. Although such equipment can be used for monitoring quite different parameters or magnitudes, the necessity of an electrical supply voltage or potential or a line for an electrical signal, can constitute a major drawback of these state-of-the-art systems. This is particularly true for equipment wherein the feelers thereof are installed or introduced into an explosive or explosion endangered environment.

Furthermore, there are known to the art monitoring devices, the feeler of which experiences, by virtue of the parameter to be monitored, a change in its mechanical state, which then can be gainfully employed as an output signal and further transmitted by mechanical means to a suitable evaluation device. Generally, however, such feelers only have a limited sensitivity, and it is extremely difficult to mechanically further transmit the output signal. It is for this reason that the evaluation device must be arranged as close as possible to the feeler itself.

In order to avoid the aforementioned drawbacks, there also have become known to the art monitoring apparatuses, wherein the feeler thereof contains a liquid and the output signal of which is infed, by means of a liquid or fluid line, to an evaluation device. Also this prior art equipment is associated with manifest drawbacks, there only being mentioned, by way of example, the problems associated with proper sealing and checking of the tightness of such lines or conduits and the volume and signal changes caused by the thermal dilatation of the line or conductor.

Due to the development of fiber optics there has now been afforded a transmission line or conductor, by means of which the weakest optical signals can be transmitted over large distances and/or markedly curved line paths.

SUMMARY OF THE INVENTION

Therefore, with the foregoing in mind it is a primary object of the present invention to provide a new and improved construction of a feeler for a monitoring apparatus which is not afflicted with the aforementioned drawbacks and shortcomings of the prior art proposals.

Another and more specific object of the present invention aims at providing a new and improved construction of feeler which, as a function of a parameter which is to be monitored, generates a signal which can be transmitted by means of an optical conductor or guide.

Now in order to implement these and still further objects of the invention, which will become more readily apparent as the description proceeds, the feeler of the present development is manifested by the features that the optical conductor has a separation location, and wherein the optical coupling of the optical conductor can be varied as a function of the parameter or magnitude to be monitored.

A first preferred embodiment of the novel feeler of this development is contemplated for monitoring apparatuses, wherein there is utilized, at least at the region of the feeler, the same optical conductor both for the infeed of the monitoring signal and also for the further transmission of such signal, and is particularly manifested by the features that the separation location is formed by the end surface of the optical conductor and a reflector coacting therewith. Further, the optical coupling is determined by the mutual optical alignment between the conductor end surface and the reflector and/or the transparency of the space between the conductor end surface and the reflector.

A second preferred embodiment of the novel feeler of this development, for use with monitoring apparatuses, contemplates that the optical conductor is constructed as a loop and is manifested by the features that the separation location is formed by the end surfaces of neighboring conductor elements. Further, the optical coupling is governed by the mutual alignment of such end surfaces or sections and/or the transparency of the space between such end sections.

The feeler of the present development does not generate any signal, rather is only provided for changing a monitoring signal which is generated by a separately arranged signal source. This change of the monitoring signal is accomplished by the action or influence of the parameter to be monitored, and it is for this reason that the feeler need not be supplied with operating energy. This beneficially renders possible installation of the feeler even in environments which are quite explosion endangered. The novel feeler can be advantageously utilized or adapted for various fields of use, especially for monitoring mechanical, thermal, optical, electrical and magnetic parameters or magnitudes, but also as a gas or liquid detector. The sensitivity of the feeler equally can be accommodated to the specific requirements, and for certain embodiments it is possible to obtain increased sensitivity than was heretofore possible with conventional systems.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically illustrates a monitoring apparatus equipped with an optical signal line or conductor;

FIG. 2 is a perspective view of a feeler which can be used as a temperature reporting device and as a gas detector;

FIG. 3 is a perspective of a feeler which is constructed as a temperature reporting or sensing device;

FIG. 4 is a sectional view through a temperature feeler having an irreversible change of the optical coupling;

FIG. 5 is a sectional view through a temperature feeler with reversible change of the optical coupling;

FIG. 6 is a sectional view through a different construction of temperature feeler having an irreversible change of the optical coupling;

FIG. 7 is a sectional view through a feeler for electrical potentials;

FIG. 8 is a sectional view through a pressure feeler possessing a direct display or indicator device;

FIG. 9 is a sectional view through a first construction of oscillation feeler; and FIG. 10 is a schematic illustration of a second construction of oscillation or vibration feeler.

DETAILED DESCRIPTION OF THE PREFERRED EMBODIMENTS

Describing now the drawings, in FIG. 1 there is schematically illustrated a monitoring apparatus equipped with a number of feelers or sensors constructed according to the invention. In the exemplary embodiment under discussion the monitoring apparatus will be seen to contain a light source 10, generating a monitoring signal, and a light receiver 11 which responds to changes of the monitoring signal and trips a fault signal or an alarm device as soon as this change has exceeded an adjustable tolerance value or threshold. The monitoring apparatus contains a multiplicity of feelers or sensors 13, 14, 15, 16 and 17, by way of example, suitable for monitoring one or a number of parameters or magnitudes which are to be supervised. With the illustrated exemplary embodiment the feelers 13, 14, 15, 16 and 17 are connected in series by means of a number of optical conductors or guides 19, 20, 21, 22, 23 and 24. The one feeler 16 contains an additional optical conductor 26, whose end surface or section is clearly visible accessible to an observer and the function of which will be described more fully hereinafter in conjunction with the embodiment of FIG. 8.

It should be understood that with the illustrated series circuit configuration there is triggered a fault signal or an alarm whenever any one or a number of feelers impair the further transmission of the optical monitoring signal. Since, in the case of a series circuit configuration the impairment of the signal transmission, caused by the individual feelers, is summed or added, it is advantageous, in the case of an installation working with a large number of feelers, if the plurality of series circuits, each of which contains only a few feelers, are connected in parallel or, in fact, if there is operatively associated with each feeler an individual signal line.

Now in FIG. 2 there is shown in perspective view details of a first exemplary embodiment of feeler, particularly suitable for monitoring a predetermined temperature range. Here, the feeler contains a holder block 29 or equivalent structure, at which there is formed, as by casting or molding, a torsion-free support rail 30 and a bimetallic strip 31. At the free end of the support rail 30 there is attached a reflector or mirror 32 and at the opposite part of the metallic strip 31 there is secured the end or end portion 34 of an optical conductor 33.

The support rail 30 and the bimetallic strip 31 are aligned relative to one another such that, when encountering normal ambient temperature conditions, the light departing from the conductor end 34 will be reflected back by the reflector or mirror 32 into such conductor end or end portion 34. As soon as the bimetallic strip 31 experiences a deflection, due to a change in the ambient temperature, then also the end surface or portion 34 of the optical conductor 33 will be displaced relative to the stationary reflector or mirror 32, and thus, the light which is reflected back to the conductor end portion 34 changes. With an extremely pronounced deflection of the bimetallic strip 31 it is possible for the reflection of light back to the conductor end portion or end section 34 to be completely interrupted. With suitable adjustment of the size of the reflecting surface of the reflector 32 and the diameter of the optical conductor 33 the reflected light is proportional to the temperature changes.

The illustrated exemplary embodiment of temperature feeler as shown in FIG. 2 can also simultaneously be used as a gas detector. To this end there is mounted at the bimetallic strip 31 a suitable catalyst material 36. Purely by way of example catalyst materials suitable for the purposes of the invention are, for instance, chromium oxide or molybdenum oxide on a substrate of active aluminium oxide, and others as taught for instance in the well known publication Ullmann, Encyclopädie der technischer Chemie, Volume 10, 1958, at pages 117–118 and page 124. During the chemical conversion of the gas which is to be detected, at the region of the catalyst or catalyst material 36, there is released thermal energy which is further conducted at the bimetallic strip 31 and causes such to bend or deflect. This, in turn, brings about a change in the optical coupling between the end surface 34 and the reflector 32, in the manner as already explained in detail heretofore.

As will be readily apparent to those skilled in the art, the described gas detector can be adapted, by appropriate selection of the catalyst, for the detection of the most different gases or vapors and can be employed for different gas or vapor concentrations.

FIG. 3 illustrates in perspective view a second exemplary embodiment of the novel feeler, here designed as a thermo-differential reporting device. This feeler likewise contains a holder block 38 or equivalent structure, at which there are cast or otherwise appropriately provided two bimetallic strips 39 and 40. The one bimetallic strip 39 is cast into a block or block member 41 formed of any suitable easily flexible, thermally insulating material. At the region of the free end of each bimetallic strip 39 and 40 there is arranged an optical conductor 42, 43, and the not particularly referenced end surfaces or end portions of such conductors, in the rest condition or state of the feeler, are aligned with respect to one another, so that the light emanating from the one end surface arrives, practically without any change, at the other end surface. The space between the confronting end surfaces of the optical conductor, 42, 43 constitutes the optical coupling.

In the presence of a rapid temperature change the freely exposed bimetallic strip 40 tends to deflect or bend appreciably more rapidly than the other bimetallic strip 39 which is thermally insulated by the block or block member 41. In the presence of an extremely slow temperature change the freely exposed bimetallic strip 40 and the thermally insulated bimetallic strip 39 tend to deflect or bend practically parallel to one another. Hence, in the presence of a rapid temperature change the optical coupling between the end surfaces of the optical conductor or guide 42, 43 changes, whereas in the presence of a slow temperature change such optical coupling remains practically unaltered. Hence, there is beneficially attained the result that the feeler, in the presence of rapid temperature changes, influences the monitoring signal, whereas in the presence of slow temperature changes, which, for instance, correspond to the differences between daylight temperature and night temperature, the optical coupling between the end surfaces of the optical conductor 42, 43 remains unchanged.

Also, with this embodiment it should be understood that the accommodation of the thermal insulation, brought about by the enclosure block 41 for the bimetallic strip 39, to the predetermined operating conditions is well within the competence of one skilled in the art.

FIG. 4 illustrates in sectional view a feeler which, upon exceeding a maximum temperature, irreversibly interrupts the optical coupling. Here, the feeler will be seen to comprise a housing 45 composed of a good thermally conducting material. Two optical conductors 47, 48 are inserted into the internal space or chamber 46 of the housing 45. At the region of the separation location 49 between the optical conductors 47, 48, and which separation location constitutes the optical coupling, there is inserted a sleeve 51 over the end regions or portions of both of these conductors or guides 47, 48. This sleeve or sleeve member 51 consists of an intensely colored or optically non-transparent material having a defined melting point.

As soon as the housing 45 has been heated to a temperature which is greater than the melting temperature of the sleeve member 51, the latter is melted and the material of the sleeve member 51 flows into the separation location 49 and therefore interrupts the optical coupling between the ends of the optical conductors or conductor means 47, 48.

This process can be further intensified if, according to the showing of FIG. 4 there is arranged within the internal chamber or space 46 of the housing 45 a displaceable piston 52. The piston 52 is biased, with the aid of a spring 53, against the sleeve member 51. With this exemplary embodiment the molten material of the sleeve member 51 is pressed, due to the action of the piston 52 which is biased by the pressure of the spring 53 or equivalent structure, rapidly and completely into the separation location 49, as soon as the housing 45 of the feeler has been heated to the melting temperature of the material of the sleeve member 51.

FIG. 5 schematically shows in sectional view a temperature feeler having a temperature dependent, reversible change of the optical coupling. In this case, the feeler contains a housing 55 formed of a good heat conducting material. This housing 55 has a bore 55a into which there is inserted one end of an optical conductor or guide 56 and the other end of which is closed by means of a reflector or mirror 57. Between the end surface of the optical conductor 56 and the reflector surface 57a there is embedded a thin layer 58 formed of a conventional cholesteric liquid crystal.

As is well known cholesteric liquid crystals change their color or optical transparency, as the case may be, within a defined temperature range. This process is reversible. With the described feeler or sensor there is thus altered the optical coupling between the end surface of the optical conductor 56 and the reflector or mirror 57, and thus, there is changed the intensity of the transmission signal in a defined temperature range.

FIG. 6 shows still a further embodiment of a feeler which is designed for monitoring a maximum temperature. The feeler contains a sleeve-shaped housing 60 formed of a good thermally conducting material. The housing 60 is closed by means of a cover plate or closure 61, through which there are inserted the end portions of two optical conductors 62, 63. The shorter optical conductor 62 is attached at the cover plate 61 of the housing 60 and protrudes linearly into the interior of such housing 60 approximately up to the central region thereof. The longer optical conductor 63 is flexed or bent into a substantially semi-circular configuration, at the region of the base surface of the housing 60, so that its end surface is located opposite the end surface of the shorter conductor 62 and forms in conjunction therewith a separation location 64 constituting the optical coupling. In order to maintain the flexed conductor 63 in its bent configuration there are provided a first holder block or holder 66, a curved support surface means 67 and a second holder block 68. The first holder block 66 and the curved support surface means 67 are fabricated from any suitable heat resistant plastic or of metal. The second holder block 68 consists of a material, the melting point of which corresponds to the maximum temperature which is to be monitored or supervised.

At the side wall of the housing 60 and at the region of the free end of the short optical conductor 62 there is arranged a suitable element, here shown as a screw 69, which when rotated presses upon the free end of the shorter conductor 62 and bends such downwardly. This screw 69 or equivalent structure is provided for the purpose of optimumly adjusting the optical coupling between both oppositely situated conductor end surfaces, but also furthermore allows checking the function of the feeler by an intentional adjustment of the optical coupling.

The longer optical conductor 63, at the region of the semicircular configured bent portion 63a, possesses an intense mechanical stress, which predominantly is taken up by both of the holder blocks 66 and 68 or equivalent structure. When the ambient temperature of the feeler and the feeler housing 60 has reached the maximum temperature which is to be monitored, then the holder block 68 tends to soften or melt. As a result of this happening, the leg 63b of the optical conductor 63, and which leg is located between the support surface means or support surface 67 and the separation location 64, defining the optical coupling, is deflected under the action of the inherent mechanical stress into a position which has been shown with the broken line 71. Due to the deflection of this leg 63b of the longer conductor 63 there is, of course, interrupted the optical coupling between both of the optical conductors or conductor means 62, 63.

Now in FIG. 7 there is shown an embodiment of feeler according to the invention which is advantageously employed for monitoring voltages or currents, in other words an electrical parameter. This feeler contains a substantially sleeve-shaped housing 73 which is open at both ends and formed of a good insulating material. Within the housing bore 73a there are inserted the ends or end portions, here generally indicated by reference character 74a and 75a of the optical conductors 74 and 75, respectively. At the mutually confronting end surfaces 74b and 75b of the optical conductors or conductor means 74 and 75, respectively, there are applied two polarizer foils 77 and 78, respectively. The neighboring surfaces of such foils 77 and 78 are covered with a thin layer 80 and 81, respectively, of a transparent, electrically conductive material. The space between these layers 80 and 81 is filled with a liquid crystal 82.

Moreover, the outer surfaces of the optical conductor means 74, 75 which are introduced into the housing 73, are at least partially covered with any suitable electrically conductive material, in order to thereby form the electrically conductive connections 83 and 84 between the thin layers 80 and the related outer terminals 86 and 87, respectively.

The mode of operation of this feeler corresponds to a liquid crystal display. If no electrical potential or voltage is applied to the outer terminals or electrodes 86 and 87, and thus, no electrical potential appears at the therewith connected thin layers or coatings 80 and 81, light passes, practically without hindrance, from the one optical conductor to the other. But as soon as an electrical potential is applied to the electrodes 86 and 87 and acts, by means of the thin layers 80 and 81, upon the liquid crystal 82, then there is practically interrupted the further conductance of the light. The operation of liquid crystal displays are well known in the art and therefore need not here be considered in any greater detail.

The described feeler is not only suitable for monitoring small potentials. Because liquid crystal displays take-up or draw practically no current, it is possible to also monitor electrostatic charges with such type feeler. Of course, with such feeler construction which is responsive to electrical potentials it is also possible to monitor electrical currents or magnetic fields, if the feeler is connected by means of an appropriate transducer with a current circuit or a magnetic field.

FIG. 8 schematically illustrates a feeler which is constructed so as to be suitable for monitoring pressures. As a matter of simplification of the illustration the feeler has been shown as containing the ends or end portions of two mutually aligned optical conductors 90, 91. The one optical conductor 90 can be deflected by means of a piston-and-cylinder unit or system 93, whereas the other optical conductor 91 is mounted so as to be immobile in any appropriate fashion. In the embodiment under discussion the feeler will be seen to contain an additional optical conductor 94, which corresponds to the additional conductor 26 referred to previously during the description of FIG. 1. If in response to sufficient pressure which is being monitored by the feeler the piston 93a of the piston-and-cylinder unit 93 is displaced to such an extent that the piston rod 96 presses the optical conductor 90 against an impact surface 97, then, as will be readily appreciated, there is interrupted the optical coupling between the optical conductors 90 and 91, yet the light is further transmitted from the optical conductor 90 into the optical conductor 94. Arranged forwardly of the conductor 94 is a light dispersing indicator or display plate 95.

It should be understood that most of the exemplary embodiments of the described feelers could be equipped with such additional optical conductor. If a monitoring installation contains a number of series connected feelers and if the monitoring signal is interrupted, then due to luminescence of the indicator or display plate it is possible to clearly discern which feeler is responsible for the interruption of the monitoring signal.

FIG. 9 illustrates a further exemplary embodiment of a feeler which is provided especially for detecting vibrations or oscillations and reporting the same. With this arrangement the feeler will be seen to contain a preferably closed housing 100 having two oppositely situated walls 101 and 102. Piercingly extending and guided through each of these walls 101 and 102 are the respective optical conductors 103 and 104 and the same are mechanically fixed thereat. The end surfaces 103a and 104a of the optical conductors 103 and 104, respectively, are aligned axially symmetrically with respect to one another. The one optical conductor 103 is shown to be considerably longer than the other optical conductor 104, which only protrudes slightly out of the housing wall 102. The longer optical conductor 103 functions as a spring, which upon jarring or vibrating the housing 100 is excited into oscillations. The amplitude of these oscillations can be further augmented if the extremely small mass of the resilient optical conductor 103 is increased through placement thereon of a sleeve 105 or other weight-like structure.

If this oscillation or vibration reporting feeler is vibrated or jarred, then the longer conductor 103, designed as a spring or resilient element as explained above, begins to oscillate in a given plane containing the lengthwise axis of the conductor 103, and there is periodically interrupted the optical coupling between both of the optical conductors or conductor means 103, 104. It should be readily apparent that this feeler responds most intensely to such vibrations or oscillations whose primary direction of motion is located transversely with respect to the lengthwise axis of the optical conductor 103.

Finally, FIG. 10 illustrates a further embodiment of feeler containing two optical conductors 107 and 108 and a toothed wheel or gear 109 or the like. The one optical conductor 107 is mounted so that it is non-displaceable, while the other optical conductor 108 is adhesively bonded or otherwise appropriately fixed to a resilient element 112, here shown as a resilient ledge member 112. Additionally, a spring 113 or equivalent structure is provided, which presses upon the free end or end section 108a of the other optical conductor 108, thereby causing the resilient or spring ledge 112 to always bear against the flank of one of the teeth 109a of the toothed wheel 109. Moreover, both of the optical conductors or conductor means 107, 108 only then possess an optimum optical coupling therebetween when the resilient ledge member or ledge 112 bears upon the tip or crown of one of the teeth 109a.

Upon rotation of the toothed wheel or gear 109 in the direction conveniently indicated by the arrow 110, it will be understood that there is suddenly interrupted the optical coupling between the two optical conductors 107, 108, then the same continuously increases until again attaining a maximum value, whereupon the reestablished optical coupling is again suddenly interrupted. In this way it is possible by appropriately counting the interruptions in the transmission or monitoring signal to measure, for instance, the angular rotation of the toothed wheel 110 or the rotational velocity or the number of revolutions.

It should be understood that, apart from the desribed exemplary constructions of the new and improved feeler of the present development, it is possible to device many different other exemplary feeler constructions or to adapt the described embodiments to special operational requirements. For instance, it is possible and, in fact, even can be advantageous to utilize, instead of the single-fibre optical conductor shown purely in this form as a matter of convenience in simplification of the illustration, a bunch or bundle of light conducting fibres or a conductor bundle or equivalent. In all of the illustrated embodiments it is possible to use, instead of optical conductors, also one conductor and a reflector or mirror or instead of the illustrated reflector or mirror to employ a second optical conductor, as the case may be. Equally, the optical coupling need not be altered merely by deflection of the optical conductor, but also can be changed by deflecting the reflector or mirror. It is moreover possible to oppositely deflect both of the optical conductors or, as the case may be, the optical conductor and the related reflector or mirror, thereby increaseing the sensitivity of the feeler or detection system. The feeler shown in FIG. 2 can be particularly advantageously constructed as a fire alarm, responding both to temperature increases and also to catalytically convertible gases, and there is a cumulative effect of the action of the temperature increase and the gas conversion. Additionally, the optical coupling between two immobile or non-displaceably mounted optical conductors or one immobile optical conductor and an equally immobile reflector, can be altered by insertion, such as by pivoting or displacement of a light impervious separation wall between these components, for instance a mercury column of a thermometer. Instead of using bimetallic strips which can be continuously deflected or bent-out, it is also possible to use mechanically pre-biased bimetallic snap strips or disks, which at a defined temperature or at a defined pressure suddenly interrupt the optical coupling. With the exemplary embodiment shown in FIG. 6, the holder block 68 is fabricated from a plastic which can be dissolved in liquid hydrocarbon materials and there may be formed at the housing 60 one or a number of bores, not particularly shown in FIG. 6, through which the liquid can be introduced into the interior of such housing. In this way this embodiment of feeler can be beneficially also utilized as a liquid detector.

The embodiment shown in FIG. 9 can be constructed as a level switch. To that end there are formed at the housing 100 bores which are suitable for infeeding into the housing a liquid and the sleeve 105 is then fabricated from a material which floats upon the liquid which is to be monitored, and thus, alters or interrupts the optical coupling between both of the optical conductors 103, 104.

Finally, it is still further mentioned that the feeler, due to the small diameter of the optical conductor or conductor means, can be fabricated with extremely small dimensions. This renders possible arranging the feeler in close proximity to the element or otherwise which is to be monitored and then such that it is practically not visibly discernible.

While there are shown and described present preferred embodiments of the invention, it is to be distinctly understood that the invention is not limited thereto, but may be otherwise variously embodied and practised within the scope of the following claims. ACCORDINGLY,

What I claim is:

1. A feeler arrangement for a monitoring apparatus comprising:
   a light source for generating a monitoring signal;
   a pair of optical conductor means for transmitting the monitoring signal;
   a light receiver which, in the presence of a change of the monitoring signal, generates a fault signal;
   said pair of optical conductor means coacting with one another to define a separation location embodying an optical junction, the transmittance of which can be altered as a function of a parameter which is to be monitored;
   respective bimetallic elements upon which there are arranged both of said optical conductor means; and
   one of said respective bimetallic elements being encased within a material having a reduced thermal conductivity.

2. The feeler arrangement as defined in claim 1, further including:
   a display plate coacting with one of said pair of optical conductor means and, upon deflection of the other of said pair of optical conductor means, the beam of light is deflected into the one optical conductor means for optical display at said display plate.

3. The feeler arrangement as defined in claim 1 for a monitoring apparatus whose optical conductor means is constructed in the form of a loop, wherein:
   said separation location being constituted by the end surfaces of neighboring conductor elements; and
   said optical junction being governed by at least any one of the mutual alignment of said end surfaces.

4. The feeler arrangement as defined in claim 1, wherein:
   at least one of said pair of optical conductor means is arranged at the region of said separation location upon one of said bimetallic elements in order to perform continuous temperature monitoring.

5. The feeler arrangement as defined in claim 1, wherein:
   both of said optical conductor means are respectively arranged upon said bimetallic elements which work in opposed directions.

6. The feeler arrangement as defined in claim 1, wherein:
   said respective bimetallic elements include bimetallic snap disks having a defined jump temperature in order to monitor a threshold temperature.

7. The feeler arrangement as defined in claim 1, further including:
   catalyst means for cooperating wih said respective bimetallic elements;
   said catalyst means generating heat in the presence of a gas which is to be monitored in order to enable monitoring of a gas concentration.

* * * * *